Feb. 16, 1971 L. B. RUTHAZER 3,564,557
SELF-CLOCKING RECORDING
Filed May 21, 1968 2 Sheets-Sheet 1

LEONARD B. RUTHAZER
*Inventor*

Feb. 16, 1971 L. B. RUTHAZER 3,564,557

SELF-CLOCKING RECORDING

Filed May 21, 1968 2 Sheets-Sheet 2

LEONARD B. RUTHAZER
*Inventor*

3,564,557

SELF-CLOCKING RECORDING

Leonard B. Ruthazer, Norwood, Mass., assignor to Honeywell Inc., Minneapolis, Minn., a corporation of Delaware Filed May 21, 1968, Ser. No. 730,756
Int. Cl. G08c 9/04; G11b 5/02, 27/28
U.S. Cl. 346—74 22 Claims

ABSTRACT OF THE DISCLOSURE

A serial coding arrangement for binary information is described following the requirement that at least every other bit position contains a signal transition. To achieve this, a coding scheme is used in which three of the possible configurations of two binary bits of information are encoded as three unique three bit configurations and the fourth two bit configuration is encoded along with the following two bits of binary input information in one of four unique six bit configurations. This could be described as variable length coding and implementation arrangements for both the encoding and decoding are disclosed.

BACKGROUND OF THE INVENTION

In most serial recording or transmission of binary data some form of clock is used to help in defining bit positions in the data read out of the recording or receiver. The higher the recording density, the greater the precision required of the clock. Sometimes a separate clocking track is recorded on the recording medium, but for most efficient utilization of the recording material it is desirable to be able to derive and synchronize the clock from the data stream itself. Since data streams often have a large number of absenses of signal transitions, in order to use the recorded data for self-clocking purposes, it is necessary to code it in a manner to insure the periodic appearance of transitions at some predetermined limited spacing. The closer the guaranteed spacing of transitions, the higher the possible recorded density.

U.S. Patent No. 3,374,475, in the name of Andrew Gabor, discloses a self-clocking recording system in which two bits of incoming binary information are always encoded as three bits. In order to achieve this and still obey the rule that no consecutive absenses are permitted, Gabor used an arrangement in which he sometimes changed his code, depending upon the configuration produced by coding the previous two bits. This can be described as a variable mode coding system in which the mode of coding depends at least in part on look-behind or look-ahead. The look-behind or look-ahead requirement can be avoided by encoding with a greater number of bits. However, this would reduce the efficiency of the coding.

SUMMARY OF THE INVENTION

The present invention provides a coding scheme in which the number of coded bits has the same two-to three-relationship used by Gabor but requires neither look-ahead nor look-behind. In accordance with the invention it is even possible to reduce the three for two ratio slightly. The invention achieves this by a variable length coding arrangement in which three of the possible four 2-bit information patterns are encoded as three bits and the fourth 2-bit pattern is coded together with the following two bits on the incoming data stream as a code of more than three but less than seven bits. In one embodiment of the invention six bits are used. The variable length code of the invention permits an additional requirement that each code pattern terminate with a transition. In a variation of the code, each signal pattern must begin with a signal transition.

Following one of these rules, adjacent code patterns will never produce double absenses. Therefore, neither look-ahead or look-behind are necessary. The invention further provides hard logic encoding and decoding arrangements in a recording system for non-return to zero recording with shift registers serving as input and output buffers permitting accommodation of the variable lengths involved.

Thus, it is an object of the invention to define a novel method of coding binary information whereby it can be used in self-clocking recording systems with a signal transition in at least every other binary bit position.

It is a further object of the invention to define a method of self-clocking coding of binary information in which at least every other bit position contains a signal transition without a coding requirement of look-ahead or look-behind.

It is a further object of the invention to define a method of ciding binary information for self-clocking recording in which the length of the code and the number of incoming bits coded as a group is variable.

It is still a further object of the invention to define a non-return to zero recording system in which binary information is encoded in a novel self-clocking code in which at least every other binary bit position has a signal transition, applying the coded information to a recording transducer and, in reading out the recorded information, decoding it so that at the read output it is a faithful reproduction of the original incoming binary information.

It is a further object of the invention to define a novel circuit arrangement for encoding binary information in accordance with a self-clocking code to drive a recording transducer and to read out the coded information into a decoder to provide the information in its original form.

Further objects and features of the invention will become apparent upon reading the following specification together with the drawings.

DESCRIPTION OF THE PREFERRED EMBODIMENTS

Figure 1:
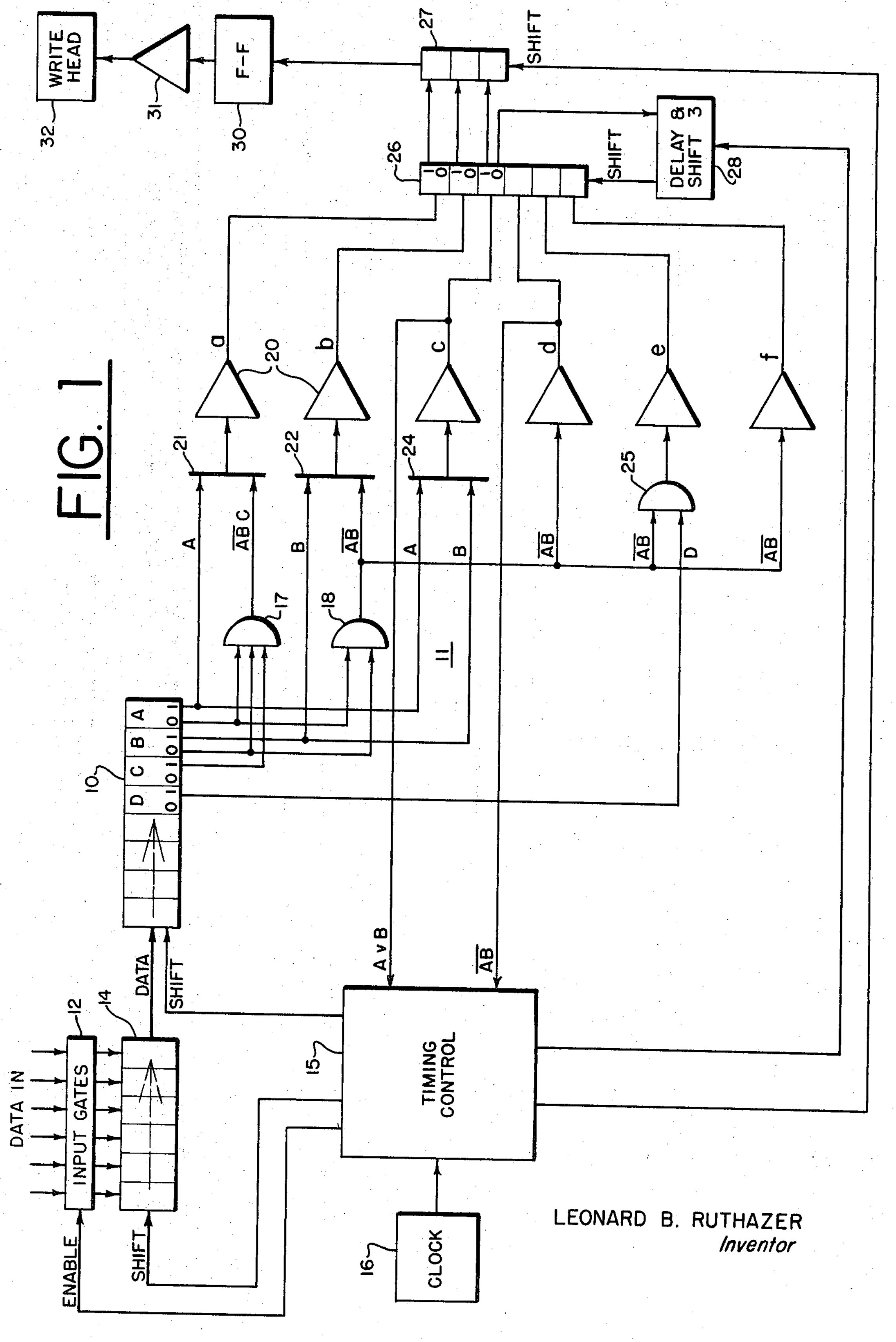
FIG. 1 is a diagram partially in block form illustrating the encoding and driving portion of a recording deivce in accordance with a preferred embodiment of the invention.

The self-clocking coding method of the present invention will be described in relation to an embodiment, of a self-clocking recording system in accordance with the invention, depicted in FIGS. 1 and 2. FIG. 1 depicts the encoding and write portions of the recording system for receiving characters of binary information and coding them in accordance with the self-clocking code then driving the write head of the recorder in a non-return to zero mode.

Serial-in parallel-out shift register 10 is depicted operating in conjunction with encoder 11 of hard logic circuitry. Input gates 12, driving shift register 14 has a parallel input to receive incoming binary information in the form of six bit characters. While the embodiment in FIG. 1 is described for handling incoming characters of six bits, it is to be understood that the number of bits per character is not critical and that the system could just as well be arranged to handle characters of any bit length. In order to accommodate longer characters, gates 12 and shift register 14 would have to be extended to accommodate the number of bits per character. While the incoming characters are depicted as being entered into shift register 14 by gates 12 in parallel, it is to be recognized that, if the incoming binary information is in serial form, it can be entered into register 14 serially shifted.

Shift register 14 is connected to shift register 10 for shifting binary information to shift register 10. Shift register 10 requires at least four bit positions for driving encoder 11. However, for ease of arranging and timing the incoming binary information from register 14, extra storage space in shift register 10 is desirable. Thus, shift register 10 is depicted as having 8 bit storage positions.

Timing control 15, connected to receive timing signals from clock 16, controls the timing of various enable and shift signals to the different gates and shift registers. Thus, the are output connections from timing control 15 to shift register 10, input gates 12 and shift register 14.

The four bit positions on the right end of shift register 10 are designated by the capital letters A, B, C and D and are depicted as having both "0" outputs and "1" outputs. For example, these positions of register 10 can be flip-flops in which an output at the "1" designation indicates one position of the flip-flop and the output at the "0" designation indicates the other condition of the flip-flop. For the purposes of the present invention a "1" output will be considered as a "1" bit and a "0" output will be considered as a "0" bit.

The four bit positions, A, B, C and D of shift register 10 are connected through encoding logic 11 to six output amplifiers 20 with their output connections designated by the lower case letters, *a*, *b*, *c*, *d*, *e* and *f*. The encoding depicted utilizes three AND gates, 17, 18 and 25 as well as three OR gates, 21, 22 and 24. The connections to these gates from shift register 10 is best described by referring to the following encoding table.

TABLE I.—ENCODER $$A v \overline{AB}C = a$$
$$B v \overline{AB} = b$$
$$A v B = c$$
$$\overline{AB} = d$$
$$\overline{AB}D = e$$
$$\overline{AB} = f$$

The logical combinations called for in Table I are produced by the encoding gates as follows: $\overline{AB}$ and C are produced from AND gate 17 with inputs from A "0," B "0" and C "1" of shift register 10. $\bar{A}$ and $\bar{B}$ is produced by AND gate 18 from the outputs of A "0" and B "0" of shift register 10. The output of AND gate 17 is connected through OR gate 21 with the A "1" output of shift register 10 to provide the *a* encode to a first amplifier 20. The $\bar{A}$ and $\bar{B}$ output of AND gate 18 is connected to OR gate 22 along with the B "1" output of shift register 10 to provide the *b* encode to a second amplifier 20. The A "1" output and the B "1" output of shift register 10 are each connected to OR gate 24 to provide the *c* encode to a third amplifier 20. The $\bar{A}$ and $\bar{B}$ output of AND gate 18 provides the *d* encode to a fourth amplifier 20. The $\bar{A}$ and $\bar{B}$ output of AND gate 18 and the D "1" output from shift register 10 are each connected to AND gate 25 to provide the *e* encode to fifth amplifier 20 and the $\bar{A}$ and $\bar{B}$ output of AND gate 18 provides the *f* encode to sixth amplifier 20.

The *c* encode output representing A or B is used in the depicted coding method as an input to timing control 15 to cause each of registers 10 and 14 to shift their contents two positions to the right. The *d* encode output representing $\bar{A}$ and $\bar{B}$ is connected to timing control 15 which in response to this signal will provide a delay and then shift registers 10 and 14 each four positions to the right. The output of encoder 11 is connected in parallel to shift register 26. The first three positions of shift register 26 are connected to the A, B and C outputs and these same positions of shift register 26 are connected to provide parallel inputs to shift register 27.

Shift register 26 is depicted as a six position shift register, each position suitably comprising a flip-flop with both "1" and "0" outputs as with register 10. The "1" outputs of the first three positions are connected to three respective positions of shift register 27.

The "0" output of the third position is connected to control circuit 28. Control circuit 28 is a delay and shift circuit operative on a "0" output from the third position of register 26. Control circuit 28 can for example comprise a delay flip-flop and a three-state counter. The delay of the delay flip-flop would be controlled by timing pulses from timing control 15 to cover the time that the coded bits in the first three positions of register 26 are registered and shifted by register 27 to write drive flip-flop 30. The three-state counter would then be activated by the delay flip-flop to count three pulses into the shift input of register 26.

The serial output of shift register 27 is connected to flip-flop 30. Flip-flop 30 is a complementing flip-flop that reverses state with each input "1" bit. The output of flip-flop 30 is connected to drive amplifier 31 which in turn is connected to drive a recording transducer 32.

Recording transducer 32 is, for example, the recording head of a magnetic recording system of the tape, disk or drum variety.

To understand the operation of FIG. 1, it is necessary to have an understanding of the particular code used with this system. This code is set forth in Table II in which the left hand column is the uncoded incoming data and the right hand column is the encoded data.

TABLE II.—VARIABLE LENGTH CODE

| A | B | C | D | a | b | c | d | e | f |
|---|---|---|---|---|---|---|---|---|---|
| 1 | 1 | | | 1 | 1 | 1 | | | |
| 1 | 0 | | | 1 | 0 | 1 | | | |
| 0 | 1 | | | 0 | 1 | 1 | | | |
| 0 | 0 | 1 | 1 | 1 | 1 | 0 | 1 | 1 | 1 |
| 0 | 0 | 1 | 0 | 1 | 1 | 0 | 1 | 0 | 1 |
| 0 | 0 | 0 | 1 | 0 | 1 | 0 | 1 | 1 | 1 |
| 0 | 0 | 0 | 0 | 0 | 1 | 0 | 1 | 0 | 1 |

It is to be understood that the incoming binary information can be a continuous stream or it can be grouped in groups of any number. Regardless of such grouping, the encoding system takes the bits either two at a time or four at a time as depicted in Table II.

FIG. 1 depicts a six-bit character input to which input characters are available as required. A first six-bit character is entered into register 14 in parallel and shifted by timing control 15 into the far right positions of register 10 leaving register 14 and the last two positions of register 10 vacant.

The data in positions A, B, C and D of register 10 is encoded by encoding logic 11 and entered in parallel into register 26. If either A or B is "1," then only the *a*, *b* and *c* encode can be written representing the encode of A and B. The *a*, *b* and *c* encode is transmitted to register 27 from register 26 and then shifted to flip-flop 30. At the same time, the A or B signal represented by the amplified output of OR gate 24 is connected to timing control 15 to control the shifting of register 10. With A or B true, timing control 15 will advance register 10 two positions. It is to be noted that the C and D positions of register 10 were encoded but not used. Now the data from these positions is moved up to the A and B positions and will be encoded again along with new data in the C and D positions.

If the A or B condition continues true, the data in register 10 will continue to be advanced two bits at a time with a new character being entered and shifted over to register 10 as soon as the previous one has been completed.

If A or B is not true—i.e. $\overline{AB}$ is true, then the encoded *a*, *b*, *c*, *d*, *e*, *f* for all four bits A, B, C, D, must be written. In the embodiment of FIG. 1 this is accomplished by detecting the $\overline{AB}$ condition at the "0" output of the third position of register 26. This output starts the delay in control circuit 28. During the delay, the *a*, *b*, and *c* encode is registered in register 27 and shifted serially to operate write flip-flop 30. At the end of the delay, the *d*, *e* and *f* encode is shifted up to the first three positions in register 26 by three shift pulses from control circuit 28. The $d$, $e$ and $f$ encode then follows the $a$, $b$, and $c$ encode into register 27 and on to flip-flop 30.

The amplified $\overline{AB}$ output of AND gate 18 actuates timing signals in timing control 15 to advance four new bits into the A, B, C and D positions of register 10. This is where the extra bit positions in register 10 are useful. First a delay is provided by the timing control until a new character is registered in register 14. Then two bits of this character are shifted into the last two positions of register 10. Register 10 is then shifted ahead four moving four new bits into positions A, B, C and D and at the same time filling the remaining four positions with the remaining four bits of the character in register 14.

Many variations of the encoding implementation as well as several variations of the code itself are readily used.

Timing is governed by the relationship between input and output. In the embodiment of FIG. 1, register 27 must shift bits out to flip-flop 30 at nine times the rate at which register 14 is loaded with six-bit characters. Actual hardware implementation of FIG. 1 is simplified in practice by splitting each of registers 10 and 14 into two registers which can be described as odd and even registers. The odd registers take the odd numbered bits and the even registers take the even numbered bits.

Since shifting of registers 10 and 14 is always an even number of positions splitting up these registers in the above fashion reduces the number of shifts required and facilitates timing control.

The specific coding arrangement depicted is only one of several that are obvious from the rules governing the one. For example, any one of the possible 2-bit binary configurations can be selected as the one to be coded along with the following two bits. Thus, instead of the "00" configuration, "11," "10" or "01" could arbitrarily be selected for 6-bit encoding along with the following pair of bits. The other three 2-bit configurations can then be arbitrarily matched to any of the 3-bit encodes. Similar arbitrary matching can be applied to the six-bit encodes.

It is equally obvious in the code given that the last "1" can be omitted from the first and third 6-bit encode. Statistically, this would result in some small saving of recording space, but would complicate the implementing hardware, particularly with respect to timing. The timing would be complicated since there could not be a strict ratio of output to input timing.

The coding arrangement described requires that the last bit of each code pattern must be a "1." A similar coding arrangement can be implemented using the alternative rule that the first bit of each code pattern must be a "1." Table III illustrates this code:

TABLE III

| A | B | C | D | a | b | c | d | e | f |
|---|---|---|---|---|---|---|---|---|---|
| 1 | 1 | | | 1 | 1 | 0 | | | |
| 1 | 0 | | | 1 | 0 | 1 | | | |
| 0 | 0 | | | 1 | 1 | 1 | | | |
| 0 | 1 | 1 | 1 | 1 | 1 | 1 | 0 | 1 | 1 |
| 0 | 1 | 1 | 0 | 1 | 0 | 1 | 0 | 1 | 1 |
| 0 | 1 | 0 | 0 | 1 | 0 | 1 | 0 | 1 | 0 |
| 0 | 1 | 0 | 1 | 1 | 1 | 1 | 0 | 1 | 0 |

This code places the key to decoding in the fourth bit position, which can be a disadvantage in some systems as compared with the code of Table II.

Figure 2:
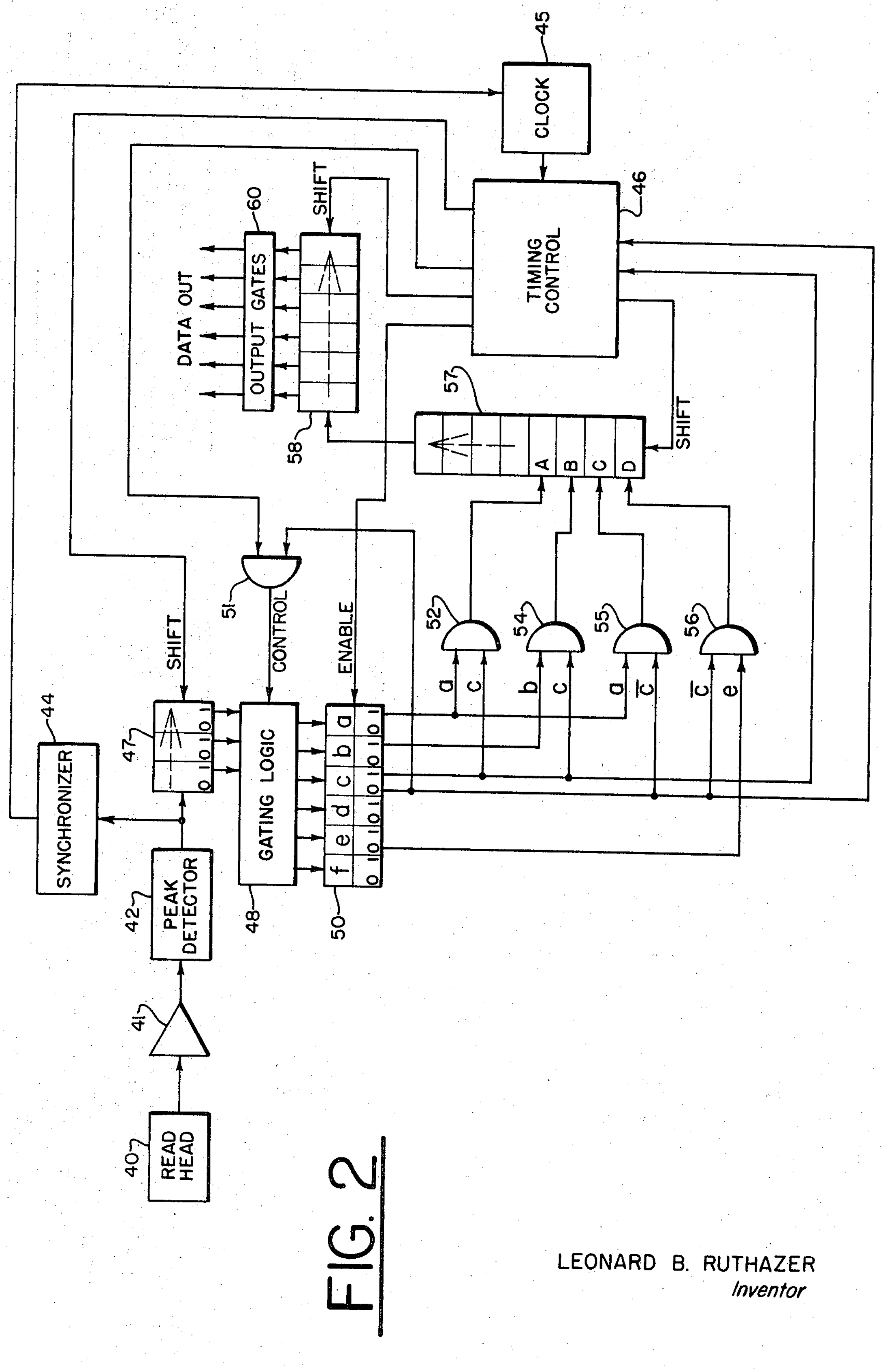
FIG. 2 is a diagram partially in block form illustrating the encoding and driving portion of a recording system in accordance with a preferred embodiment of the invention.

FIG. 2 illustrates the decoding end of a system using the encoding of FIG. 1. Thus, FIG. 2 is essentially complementary to FIG. 1. Read head 40 of FIG. 2 detects the transitions on a recording medium in which the binary information has been encoded in accordance with FIG. 1. Head 40 is connected to the input of amplifier 41 which is in turn connected to the input of peak detector 42. Peak detector 42 is a conventional peak detector for producing an output pulse timed relative to the peak of the input signal. The output of detector 42 is connected both to synchronizer 44 and 3-bit shift register 47. Synchronizer 44 is a conventional synchronizer for synchronizing clock 45 to the detected signal transitions. Synchronizer 44 is accordingly connected to clock 45 which in turn is connected as a timing source to timing control 46. Timing control 46 is connected to the various gates and registers of the decoder for accurately timing their operation.

Shift register 47 is connected in parallel through gating logic 48 to shift register 50. Shift register 50 contains six bit positions suitably provided by six flip-flops each having "0" and "1" outputs and designated by the six letters $a$, $b$, $c$, $d$, $e$ and $f$ of the encode patterns.

Gating logic 48 transfers the three bits from register 47 to positions $a$, $b$ and $c$ of register 50. If there is a $c$ "0" output from register 50, AND gate 51 passes control signals from timing control 46 to gating logic 48 causing the next three bits received by register 47 to be gated to positions $d$, $e$ and $f$ of register 50.

AND gates 52, 54, 55 and 56 decode the binary patterns in register 50 and enter the decoded bits into 8-bit shift register 57 in parallel. Whether register 57 gets a 2-bit or 4-bit decode is determined by the $c$ "0" output of register 50 connected to timing control 46 for providing shift pulses to register 57. With no output from $c$ "0," register 57 is shifted two bits at a time. With an output from $c$ "0," register 57 is delayed and then shifted four at a time.

The connections of shift register 50 to the decoding AND gates is in accordance with decode Table IV. The decodes depicted by the embodiment of FIG. 2 use only $a\bar{c}$ and $e\bar{c}$ for C and D. This is shown in the table by placing $a\bar{c}$ and $e\bar{c}$ in parentheses.

Some checking redundancy is readily added to the system by recognizing all five bits given in the Table for C and D.

TABLE IV.—DECODER $A=ac$
$B=bc$
$C=ab\bar{c}df(a\bar{c})$
$D=b\bar{c}def(e\bar{c})$ The serial output of register 57 is connected to the input of 6-bit shift register 58. The output of register 58 is connected in parallel to output gates 60.

For every nine shifts of register 47, a 6-bit character is unloaded from register 58 in parallel. The extra four bits provided in register 57 operate as a buffer similar to those in register 10 of FIG. 1.

Registers 57 and 58, similar to registers 10 and 14 of FIG. 1, can conveniently be split each into odd and even registers.

While the present invention has been described in relation to magnetic recording, the invention can be utilized in connected with various other recording and transmitting systems using optical, chemical and electrical techniques of recording and transmission of binary information. Thus, it is intended to cover the invention broadly within the spirit and scope of the appended claims.

I claim:

1. A binary coding method for self clocking recording in which at least every other data bit produces a detectable signal comprising:
(a) coding three of the four possible two-bit signal configurations as three unique three-bit signal configurations; and
(b) coding the fourth possible two-bit signal configuration with the four possible signal configurations of the next consecutive two bits in four unique signal configuration less than seven bits and more than three bits.

2. A binary coding method according to claim 1 in which said three-bit configurations are:
(a) 111
(b) 101
(c) 110
wherein a "1" is characterized as producing a detectable signal and said four unique configurations each have a "0" in the fourth bit position.

3. A binary coding method according to claim 1 in which said coding conforms to the following logical encoding table wherein the letters A, B, C, D designate consecutive binary information bits and the letters *a*, *b*, *c*, *d*, *e* and *f* designate consecutive binary encoded bits $$Av\overline{ABC}=a$$
$$Bv\overline{AB}=b$$
$$AvB=c$$
$$\overline{AB}=d$$
$$\overline{AB}D=e$$
$$\overline{AB}=f$$

4. A binary coding method according to claim 1 in which said three-bit configurations are:
(a) 111
(b) 101
(c) 011
in which a "1" is characterized as producing a detectable signal and said four unique configurations each have a "0" in the third bit position.

5. A binary method according to claim 4 in which said four unique configurations are:
(a) 110111
(b) 110101
(c) 010111
(d) 010101

6. A binary coding method according to claim 4 in which said four unique configurations are:
(a) 11011
(b) 110101
(c) 01011
(d) 010101

7. Apparatus for recording binary information in patterns of absences and presences in consecutive positions along a track so that a stream of recorded information contains a presence before and after each absence comprising:
(a) register means for receiving binary information;
(b) encoding means for encoding said binary information as three unique 3-bit configurations for three 2-bit configurations and as four unique configurations of more than three bits for a fourth 2-bit configuration together with four configurations of the following two bits;
(c) a recording transducer; and
(d) means for driving said recording transducer with the output of said encoding means.

8. Apparatus for recording according to claim 7 in which said encoding means encodes incoming binary bits in accordance with the following logical table in which A, B, C, D designate consecutive incoming information bits and *a*, *b*, *c*, *d*, *e* and *f* designate consecutive encoded bits:

$$Av\overline{ABC}=a$$
$$Bv\overline{AB}=b$$
$$AvB=c$$
$$\overline{AB}=d$$
$$\overline{AB}D=e$$
$$\overline{AB}=f$$

9. Apparatus for recording according to claim 7 in which for the said three 2-bit configurations, said means for driving comprises means to drive only 3-bit encodes from said encoding means and for said fourth 2-bit configuration, said means for driving comprises means to drive 6-bit encodes from said encoding means.

10. Apparatus for recording according to claim 7 in which said presences and absences of magnetic transitions in non-return-to-zero recording and said means for driving comprises a parallel-in-serial out shift register means to connect said shift register to the input of a bistable circuit and means to connect said bistable circuit to control drive current to said transducer.

11. A binary coding method for self-clocking recording in which at least every other data bit produces a detectable signal comprising:
(a) coding electrically three of the four possible two bit configurations as three unique three-bit configurations; and
(b) coding electrically the fourth possible two-bit configuration with the four possible configurations of the next consecutive two bits in four unique configurations less than seven bits and more than three bits.

12. A binary coding method according to claim 11 in which said three-bit configurations are:
(a) 111
(b) 101
(c) 110
wherein a "1" is characterized as producing a detectable electric signal and said four unique configurations each have a "0" in the fourth bit position.

13. A binary coding method according to claim 11 in which said coding conforms to the following logical encoding table wherein the letters A, B, C, D designate consecutive binary information bits and the letters *a*, *b*, *c*, *d*, *e* and *f* designate consecutive binary encoded bits.

$$Av\overline{ABC}=a$$
$$Bv\overline{AB}=b$$
$$AvB=c$$
$$\overline{AB}=d$$
$$\overline{AB}D=e$$
$$\overline{AB}=f$$

14. A binary coding method according to claim 11 in which said three-bit configurations are:
(a) 111
(b) 101
(c) 011
in which a "1" is characterized as producing a detectable electric signal and said four unique configurations each having a "0" in third bit position.

15. A binary coding method according to claim 14 in which said four unique configurations are:
(a) 110111
(b) 110101
(c) 010111
(d) 010101

16. A binary coding method according to claim 14 in which said four unique configurations are:
(a) 11011
(b) 110101
(c) 01011
(d) 010101

17. A binary coding method for self-clocking recording in which at least every other data bit produces a detectable signal comprising:
(a) coding magnetically three of the four possible two-bit configurations as three unique three-bit configurations; and
(b) coding magnetically the fourth possible two-bit configuration with the four possible configurations of the next consecutive two bits in four unique configurations less than seven bits and more than three bits.

18. A binary coding method according to claim 17 in which said three-bit configurations are:
(a) 111
(b) 101
(c) 110
wherein a "1" is characterized as producing a detectable magnetic signal and said four unique configurations each have a "0" in the fourth-bit position.

19. A binary coding method according to claim 17 in which said coding conforms to the following logical encoding table wherein the letters A, B, C, D designate consecutive binary information bits and the letters *a*, *b*, *c*, *d*, *e* and *f* designate consecutive binary coded bits $$Av\overline{ABC}=a$$
$$Bv\overline{AB}=b$$

$$A \vee B = c$$
$$\overline{AB} = d$$
$$\overline{AB}D = e$$
$$\overline{AB} = f$$

20. A binary coding method according to claim 17 in which said three-bit configurations are:

(a) 111
(b) 101
(c) 011 in which a "1" is characterized as producing a detectable magnetic signal and said four unique configurations each have a "0" in the third bit column.

21. A binary coding method according to claim 20 in which said four unique configurations are:

(a) 110111
(b) 110101
(c) 010111
(d) 010101

22. A binary coding method according to claim 20 in which said four unique configurations are:

(a) 11011
(b) 110101
(c) 01011
(d) 010101

References Cited

UNITED STATES PATENTS

| | | | |
|---|---|---|---|
| 3,400,375 | 9/1968 | Bowling et al. | 340—347X |
| 3,461,237 | 8/1969 | Salter | 340—347X |

BERNARD KONICK, Primary Examiner

G. M. HOFFMAN, Assistant Examiner

U.S. Cl. X.R.

178—113; 340—174.1, 347

UNITED STATES PATENT OFFICE
CERTIFICATE OF CORRECTION

Patent No. 3,564,557 Dated February 16, 1971

Inventor(s) Leonard B. Ruthazer

It is certified that error appears in the above-identified patent and that said Letters Patent are hereby corrected as shown below:

In the drawings, in Figure 1, change as follows:

Output of gate 17, change "$\overline{A\ B}\ C$" to -- $\bar{A}\ \bar{B}\ C$ -- .

Output of gate 18, change "$\overline{A\ B}$" to -- $\bar{A}\ \bar{B}$ -- ;

Input to amplifier 20 having d output, change "$\overline{A\ B}$" to -- $\bar{A}\ \bar{B}$ -- .

Input to gate 25, change "$\overline{A\ B}$" to -- $\bar{A}\ \bar{B}$ -- .

Input to amplifier 20 having f output, change "$\overline{A\ B}$" to -- $\bar{A}\ \bar{B}$ -- .

Lower input to timing control 15, change "$\overline{A\ B}$" to -- $\bar{A}\ \bar{B}$ -- .

Column 3, line 13, "the", should read -- there -- ;

line 35, change "A v $\overline{A\ B}$ C = a" to -- A v $\bar{A}\ \bar{B}$ C = a -- ;

line 36, change "B v $\overline{A\ B}$ = b" to -- B v $\bar{A}\ \bar{B}$ = b -- ;

line 38, change "$\overline{A\ B}$ = d" to -- $\bar{A}\ \bar{B}$ = d -- ;

line 39, change "$\overline{A\ B}$ D = e" to -- $\bar{A}\ \bar{B}$ D = e -- ;

line 40, change "$\overline{A\ B}$ = f" to -- $\bar{A}\ \bar{B}$ = f -- ;

line 43, change "$\overline{A\ B}$" to -- $\bar{A}\ \bar{B}$ -- .

Colum 7, line 7, change "A v $\overline{A\ B}$ C = a" to -- A v $\bar{A}\ \bar{B}$ C = a -- ;

line 8, change "B v $\overline{A\ B}$ = b" to -- B v $\bar{A}\ \bar{B}$ = b -- ;

line 10, change "$\overline{A\ B}$ = d to -- $\bar{A}\ \bar{B}$ = d -- ;

line 11, change "$\overline{A\ B}$ D = e" to -- $\bar{A}\ \bar{B}$ D = e -- ;

UNITED STATES PATENT OFFICE
CERTIFICATE OF CORRECTION

Patent No. 3,564,557 Dated February 16, 1971

Inventor(s) Leonard B. Ruthazer --2--

It is certified that error appears in the above-identified patent and that said Letters Patent are hereby corrected as shown below:

line 12, change "$\overline{A\ B}$ = f" to -- $\bar{A}\ \bar{B}$ = f -- ;

line 55, change "A v $\overline{A\ B}$ C = a" to -- A v $\bar{A}\ \bar{B}$ C = a -- ;

line 56, change "B v $\overline{A\ B}$ = b" to -- B v $\bar{A}\ \bar{B}$ = b -- ;

line 58, change "$\overline{A\ B}$ = d" to -- $\bar{A}\ \bar{B}$ = d -- ;

line 59, change "$\overline{A\ B}$ D = e" to -- $\bar{A}\ \bar{B}$ D = e -- ;

line 60, change "$\overline{A\ B}$ = f" to -- $\bar{A}\ \bar{B}$ = f -- ;

Column 8, line 23, change "A v $\overline{A\ B}$ C = a" to -- A v $\bar{A}\ \bar{B}$ C = a -- ;

line 24, change "B v $\overline{A\ B}$ = b" to -- B v $\bar{A}\ \bar{B}$ = b -- ;

line 26, change "$\overline{A\ B}$ =d" to -- $\bar{A}\ \bar{B}$ = d -- ;

line 27, change "$\overline{A\ B}$ D = e" to -- $\bar{A}\ \bar{B}$ D = e -- ;

line 28, change "$\overline{A\ B}$ = f" to -- $\bar{A}\ \bar{B}$ = f -- ;

line 74, change "A v $\overline{A\ B\ C}$ = a" to -- A v $\bar{A}\ \bar{B}$ C = a -- ;

line 75, change "B v $\overline{A\ B}$ = b" to -- B v $\bar{A}\ \bar{B}$ = b -- ;

Column 9, line 2, change "$\overline{A\ B}$ = d" to -- $\bar{A}\ \bar{B}$ = d -- ;

line 3, change "$\overline{A\ B}$ D = e" to -- $\bar{A}\ \bar{B}$ D = e -- ;

line 4, change "$\overline{A\ B}$ = f" to -- $\bar{A}\ \bar{B}$ = f -- .

UNITED STATES PATENT OFFICE

CERTIFICATE OF CORRECTION

Patent No. 3,564,557 Dated February 16, 1971

Inventor(s) Leonard B. Ruthazer --3--

It is certified that error appears in the above-identified patent and that said Letters Patent are hereby corrected as shown below:

Signed and sealed this 12th day of December 1972.

(SEAL)
Attest:

EDWARD M.FLETCHER,JR.
Attesting Officer

ROBERT GOTTSCHALK
Commissioner of Patents